(12) United States Patent
Brönnimann

(10) Patent No.: US 8,123,444 B2
(45) Date of Patent: Feb. 28, 2012

(54) COOLANT SUPPLY

(75) Inventor: Martin Brönnimann, Itingen (CH)

(73) Assignee: Rego-Fix AG, Tenniken (CH)

( * ) Notice: Subject to any disclaimer, the term of this patent is extended or adjusted under 35 U.S.C. 154(b) by 697 days.

(21) Appl. No.: 12/185,831

(22) Filed: Aug. 5, 2008

(65) Prior Publication Data

US 2009/0047079 A1    Feb. 19, 2009

(30) Foreign Application Priority Data

Aug. 13, 2007 (CH) ..................... 1276/07

(51) Int. Cl.
*B23B 31/20* (2006.01)
*B23Q 11/10* (2006.01)

(52) U.S. Cl. ............ 409/136; 279/20; 408/56

(58) Field of Classification Search .......... 409/135–136; 408/56, 57, 59; 279/20
See application file for complete search history.

(56) References Cited

U.S. PATENT DOCUMENTS

| | | | | |
|---|---|---|---|---|
| 4,570,952 A | * | 2/1986 | Heimbigner et al. | 279/20 |
| 5,420,388 A | * | 5/1995 | Girardin | 219/69.15 |
| 5,567,093 A | | 10/1996 | Richmond | |
| 5,984,595 A | * | 11/1999 | Mizoguchi | 408/57 |
| 6,729,627 B2 | * | 5/2004 | Komine et al. | 279/157 |

FOREIGN PATENT DOCUMENTS

| | | | |
|---|---|---|---|
| DE | 19832793 A1 | | 3/1999 |
| EP | 0924012 A1 | | 6/1999 |
| GB | 2401335 A | * | 11/2004 |
| JP | 8-99245 | | 4/1996 |
| JP | 08112731 A | * | 5/1996 |
| JP | 11179632 A | * | 7/1999 |
| JP | 11267943 A | * | 10/1999 |
| JP | 2000246585 A | * | 9/2000 |
| JP | 2000308965 A | * | 11/2000 |
| JP | 2000317767 A | * | 11/2000 |
| JP | 2003001545 A | * | 1/2003 |
| WO | WO 84/03649 A1 | | 9/1984 |

* cited by examiner

*Primary Examiner* — Daniel Howell
(74) *Attorney, Agent, or Firm* — Hammer & Associates, P.C.

(57) ABSTRACT

The apparatus for supplying a cooling fluid to the outer surface of a tool consists of a guide element which surrounds the tool shank and gives rise to a laminar coolant flow.

3 Claims, 1 Drawing Sheet

COOLANT SUPPLY

FIELD OF INVENTION

The invention relates to an apparatus for supplying a cooling fluid to the outer surface of a tool which is clamped in a tool holder of a machine tool by means of a clamping nut.

BACKGROUND OF THE INVENTION

Machine tools in metal-cutting manufacture are as a rule equipped with cooling-lubricating devices. These deliver a cooling fluid into the working range of the tool. This takes place either by way of spray nozzles, which are disposed as near as possible to the working range of the tool, or by way of a coolant supply through the spindle of the machine tool. If the coolant is supplied through the machine spindle, it passes either through a channel in the tool to the working range of the latter or along its outer surface. The present invention relates to this latter solution, in which the cooling fluid is guided from the interior of the spindle through the tool holder to the tool shank and from here passes along the outer surface of the tool to the working range.

The supply of a cooling fluid through the machine spindle and the tool holder to the outside of the tool is known and described in WO 84/03649 or in DE-A-19832793, for example.

In practice it has become apparent that the coolant supply via the outer surface of a tool does not take place in the best possible way, in particular at high rotational speeds. The object of the invention is therefore to improve the coolant supply via the outside of the tool.

SUMMARY OF THE INVENTION

This is achieved according to the invention in that the clamping nut is provided with a guide element which consists of a guide tube which surrounds the tool shank at a spacing defining an annular gap, is widened on the machine side in the shape of a funnel and is connected to the clamping nut with the widened rim.

DETAILED DESCRIPTION OF THE INVENTION

Figure 1:
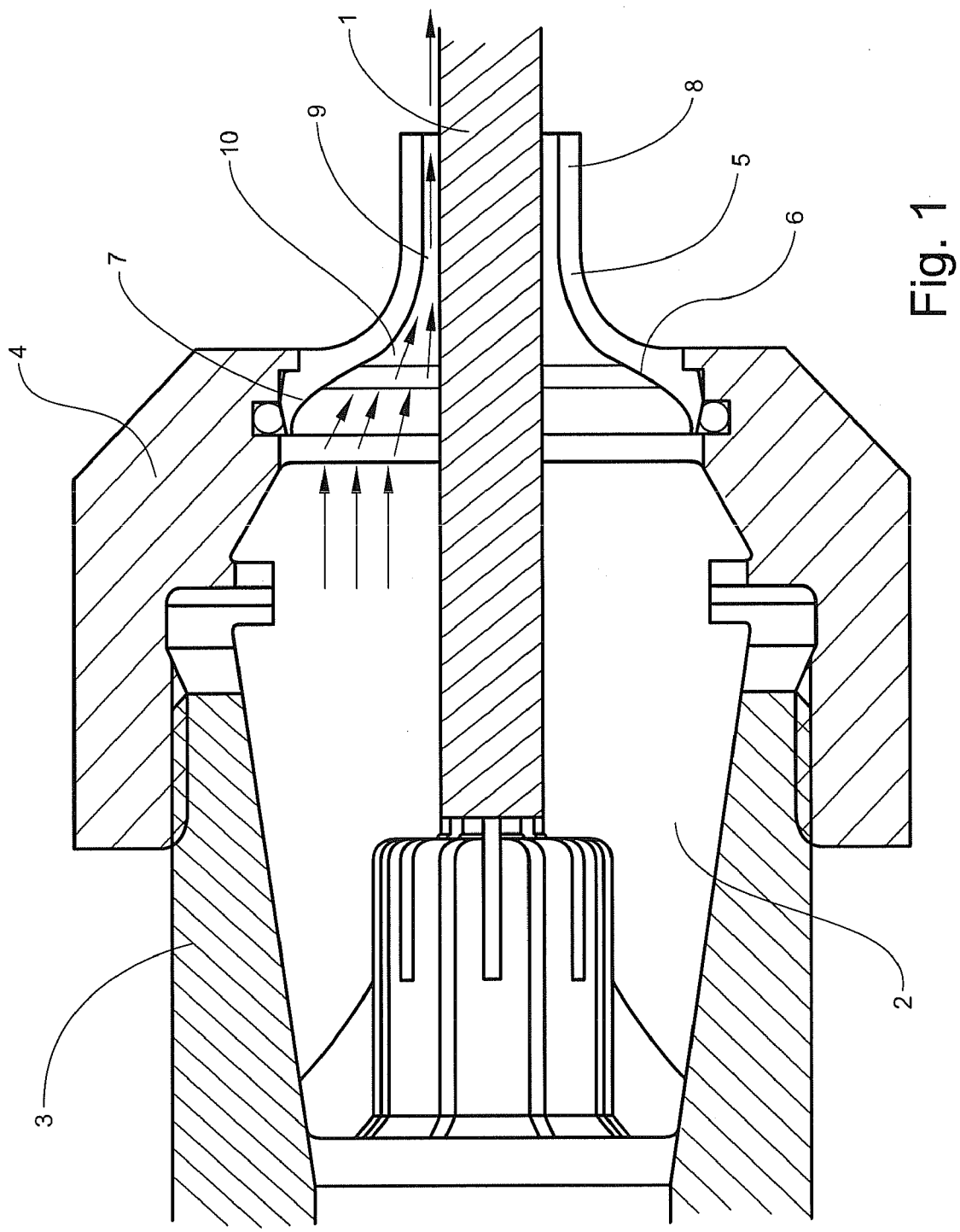
FIG. 1 is a sectional representation of a typical tool-holding fixture with inserted tool.

A preferred embodiment of the invention is described in the following on the basis of the accompanying drawing. The drawing is a sectional representation of a typical tool-holding fixture with inserted tool.

A tool shank 1 is clamped as usual in the bore of a collet chuck 2 which is seated in the holding cone of a machine spindle 3 and in turn is clamped in the holding cone by means of a clamping nut 4 which is screwed onto the spindle. The clamping nut 4 corresponds to the known clamping nuts with insertable washers. A guide element 5 is inserted in the front side of the clamping nut which is on the tool side. The guide element consists of a guide tube 8 which is directed outwards, surrounds the tool shank and on the machine side has a funnel-shaped widening 6 with an outer rim 7 which fits into the opening of the clamping nut. The inside diameter of the guide tube is larger than the diameter of the tool shank, so that an annular gap 9 remains open between the shank and the tube.

A laminar coolant flow along the tool shank is obtained by compacting the coolant flow 10 in the funnel-shaped area of the guide element 5 and the subsequent guidance in the channel formed by the annular gap 9. In the embodiment under consideration the axial length of the channel is 6-12 mm, depending on the diameter of the tool shank. In order to guarantee a clean separation of the laminar coolant flow from the guide tube, the inner rim of the guide tube which is on the tool side should not have any chamfers or rounded parts.

According to another embodiment of the invention, instead of a conventional clamping nut, in which the guide element is used instead of a washer, the guide element is formed integrally onto the clamping nut.

The optimal dimensions of the guide element depend on various factors and are to be adapted to the individual case so that the coolant flow leaves the guide tube in as laminar as manner as possible. Good results were obtained, for example, for tool shanks with diameters of 1-20 mm with an annular gap of a width of less than 1 mm, preferably approximately 0.4 mm, and an axial length of the annular gap of 6-12 mm. Dimensions which diverge slightly likewise still produce good results.

The invention claimed is:

1. Apparatus for supplying a cooling fluid to the outer surface of a tool shank (1) which is clamped in a tool holder of a machine tool by means of a clamping nut (4), characterised in that the clamping nut is provided with a guide element (5) which consists of a guide tube (8) which surrounds the tool shank (1) at a spacing defining an annular gap (9) and is provided on the machine side with a funnel-shaped widening (6) with an outer rim (7) which is connected to the clamping nut, the guide tube having an axial length of at least six times the width of the annular gap.

2. Apparatus according to claim 1, characterised in that the clamping nut (4) is integrally connected to the guide element (5).

3. Apparatus for supplying a cooling fluid to the outer surface of a tool shank (1) which is clamped in a tool holder of a machine tool by means of a clamping nut (4), characterised in that the clamping nut is provided with a guide element (5) which consists of a guide tube (8) which surrounds the tool shank (1) at a spacing defining an annular gap (9) and is provided on the machine side with a funnel-shaped widening (6) with an outer region (7) which is connected to the clamping nut, the guide tube having an axial length of at least six times the width of the annular gap.

* * * * *